Aug. 14, 1923.
G. HARPER
SOLDERING TOOL
Filed April 10, 1922
1,464,933
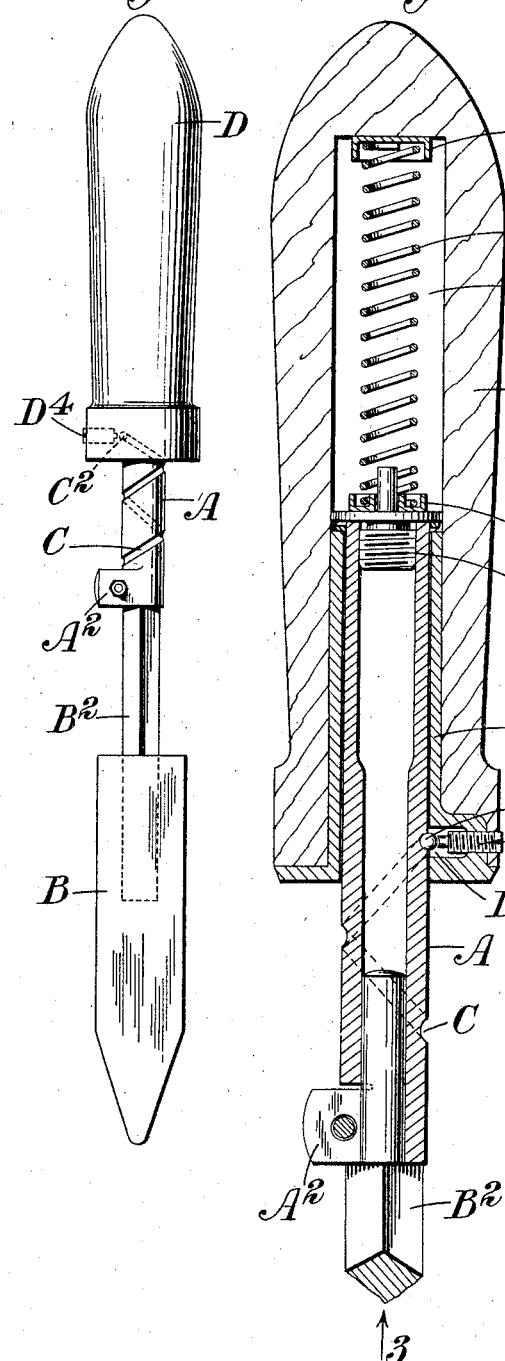
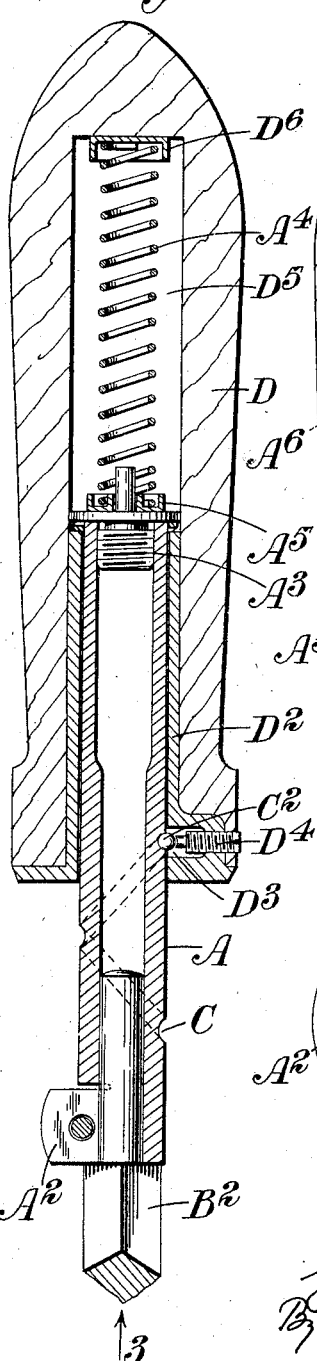
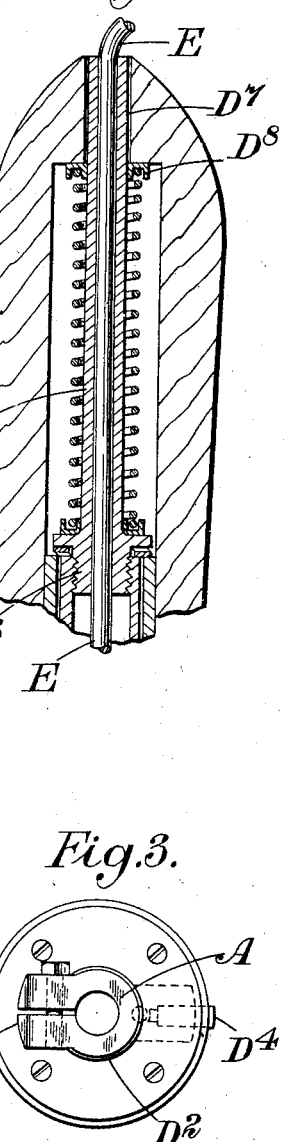
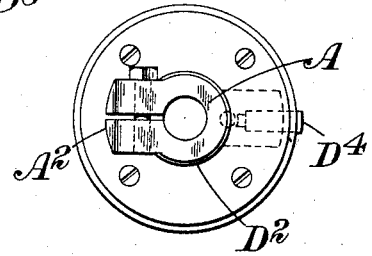
Inventor:
George Harper Patented Aug. 14, 1923.

1,464,933

UNITED STATES PATENT OFFICE.

GEORGE HARPER, OF HUNTLY, ABERDEEN, SCOTLAND.

SOLDERING TOOL.

Application filed April 10, 1922. Serial No. 551,093.

*To all whom it may concern:*

Be it known that I, GEORGE HARPER, a subject of the King of England, residing at Huntly, in the county of Aberdeen, Scotland, have invented certain new and useful Improvements in Soldering Tools, of which the following is a specification.

This invention relates to soldering tools, and it has for its object to provide an improved construction of soldering bit particularly adapted for performing the operation known as "brogging," which consists in the sealing up, with solder, of the vent holes in tins containing food and the like. The tool may be employed for other purposes, but it is particularly applicable for sealing these vent holes, as it enables this work to be done quickly and accurately without the use of highly skilled labour.

The operation of brogging consists in tinning the rim of the hole and closing the aperture with solder, and this is generally effected by twisting the bit or iron, and if the iron is too hot the solder is liable to be blown out of place before it chills. By the present invention a tool is constructed which can be used by an unskilled workman and will be effective even if the bit is excessively hot.

According to this invention, the shank of the bit is connected with the grip through a helical key connection such that when the bit is applied to the work and the grip is pressed downwards the shank and bit are rotated. Thus a slight touch and pressure of the bit upon the tin causes the solder to be applied and sprear round very rapidly before there is time for the adjacent part of the tin to become heated. The deposited solder chills immediately and the vent is effectively sealed.

The manner of carrying out the invention is illustrated in the accompanying drawings in which—

Figure 1 is an elevation of the complete tool,

Figure 2 is an enlarged view of a part of Figure 1 shewn in section,

Figure 3 is an end view of Figure 2 as seen in the direction of the arrow 3, the part $B^2$ being omitted, and Figure 4 is a fragmentary sectional view of a modified part.

Like letters indicate like parts throughout the drawings.

The shank A of the tool is tubular and is provided at one end with a clamp $A^2$ of any suitable type to receive the bit, which consists of a stem $B^2$ fitting in the clamp and carrying a heavy copper nose B of the well-known type. By this arrangement different sizes of bits may readily be employed with the same main parts.

The other end of the tubular shank is closed by a plug $A^3$ and the exterior has cut upon it a helical groove or keyway C of a quick pitch.

The hand grip fits outside the shank, comprising a wooden exterior D fixed upon a metal liner $D^2$ which slides freely on the shank A. This metal liner carries a key engaging the helical groove or keyway C, and this is preferably constituted by a steel ball $C^2$ which engages a correspondingly shaped groove in the shank, and the ball is housed in a recess $D^3$ in the liner. Preferably the ball is acted upon by a stiff spring and (or) adjusting screw $D^4$ to ensure it always keeping in engagement with the groove.

Above the plug $A^3$ closing the upper end of the shank A is a light spring $A^4$ which acts on the shank and lies in a deep recess $D^5$ in the hand grip abutting against a spring cup at each end, one, $D^6$ on the grip, and the other, $A^5$ on the shank plug $A^3$. Thus the hand grip normally lies, under the action of the spring $A^4$, as far as possible from the clamp $A^2$, but if the grip is pushed toward the clamp, the shank and the bit B carried by it are rotated one or more turns, according to the pitch of the helical groove C.

In using the tool the bit B is tinned and heated as usual, and then the acting end is pressed against the vent to be sealed, the hand grip D being pushed along the shank. This causes the shank and bit to twist one or more revolutions to spread out the solder, so that the work is effected quickly and the tool can be removed from the work before it has time to overheat the surrounding metal. Thus the solder chills immediately, and the delicate operation of twisting the tool with the fingers is not necessary. Consequently the brogging operation can be effected by unskilled workmen with little or no liability of failures.

As in some cases it may be desirable to heat the bit B by electrical means, in the known manner, the fragmentary sectional view of the grip D in Figure 4 is provided to illustrate the manner in which electrical supply cables E can be mounted without interference with the mechanism. The plug A³ at the inner end of the shank A is made hollow and is provided with a hollow extension A⁶ which has a sliding fit in an aperture D⁷ in the outer end of the grip, so that as the latter is pressed toward the bit the extension A⁶ can project from it. Through the hollow extension the cables E are led from the current source down the hollow stem A and thence to the bit B, the manner of their connection with the latter forming no part of the present invention. The washer D⁶ is suitably modified as at D⁸ to provide a central aperture through which the extension A⁶ can freely slide.

What I claim as my invention and desire to secure by Letters Patent of the United States is :—

1. A soldering tool comprising in combination with a hollow actuating handle, a tubular shank adapted to slide in the handle back and forth and provided on its exterior with a helical groove, means in said handle tending to move the said shank outwards, a clamp at the outer end of said shank for receiving and holding the bit, a plug closing the inner end of the said tubular shank and acting as a stop to limit the outward movement of said shank, and a key carried by said handle so as to engage the helical groove in said shank for the purpose described.

2. A soldering tool as specified in claim 1, comprising a metal liner secured in the said hollow handle and forming a guide for the said tubular shank.

3. A soldering tool as specified in claim 1, comprising a tubular extension provided on the said plug, and electric wires passing through the said tubular extension to the said bit.

In testimony whereof I have signed my name to this specification in the presence of two subscribing witnesses.

GEORGE HARPER.

Witnesses:
   LEWIS T. JOHNSEND,
   B. A. NOBLES.